United States Patent [19]

Behmer

[11] Patent Number: 4,948,934
[45] Date of Patent: Aug. 14, 1990

[54] PROCESSING METHOD FOR PLANETARY EROSION

[75] Inventor: Udo Behmer, Aachen, Fed. Rep. of Germany

[73] Assignee: H. C. Wilfried König, Aachen, Fed. Rep. of Germany

[21] Appl. No.: 345,087

[22] Filed: Apr. 28, 1989

[30] Foreign Application Priority Data

Apr. 30, 1988 [DE] Fed. Rep. of Germany ....... 3814675

[51] Int. Cl.$^5$ .............................................. B23H 7/28
[52] U.S. Cl. .................................................. 219/69.2
[58] Field of Search ................ 219/69.2, 69.17, 69.16, 219/69.13

[56] References Cited

U.S. PATENT DOCUMENTS

| | | | |
|---|---|---|---|
| 3,975,608 | 8/1976 | Ullmann et al. | 219/69.16 |
| 4,041,268 | 8/1977 | Braudeau et al. | 219/69.2 |
| 4,057,703 | 11/1977 | Pfau | 219/69.2 |
| 4,152,570 | 5/1979 | Inoue et al. | 219/69.2 |
| 4,247,749 | 1/1981 | Wavre | 219/69.17 |
| 4,345,131 | 8/1982 | Semon et al. | 219/69.16 |
| 4,606,007 | 8/1986 | Inoue | 219/69.16 |
| 4,697,059 | 9/1987 | Furukawa | 219/69.12 |

FOREIGN PATENT DOCUMENTS

| | | |
|---|---|---|
| 1690763 | 9/1969 | Fed. Rep. of Germany . |
| 2550649 | 5/1976 | Fed. Rep. of Germany . |
| 3038410 | 4/1981 | Fed. Rep. of Germany . |
| 3229572 | 2/1984 | Fed. Rep. of Germany . |
| 2011653 | 7/1979 | United Kingdom .............. 219/69.16 |

OTHER PUBLICATIONS

"Adaptive Regelung des Senkerodierens", Manfred Weck and Michael Slomka, VDI-Z Bd. 127 (1985) Nr. 9-Mai, pp. 319-323.

*Primary Examiner*—A. D. Pellinen
*Assistant Examiner*—Geoffrey S. Evans
*Attorney, Agent, or Firm*—Robert W. Becker & Associates

[57] ABSTRACT

A process method for planetary erosion of an existing depression using a finishing or dressing operation. A non-circular target path is used instead of the prior art method of a circular target path and predominantly circular translational movements so that the geometric shape of the electrode does not result in the workpiece volume being eroded much slower at the non-corner surface regions than in the corner regions. A preset target value path is defined for each planetary revolution by determining the actual movement of at least one preceeding planetary revolution based on the difference between the target value path and the actual value path, with each preset target value path being delimited by the final target value path.

25 Claims, 5 Drawing Sheets

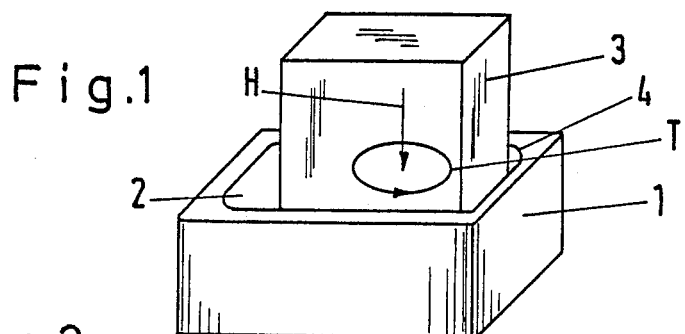
Fig.1
Fig.2
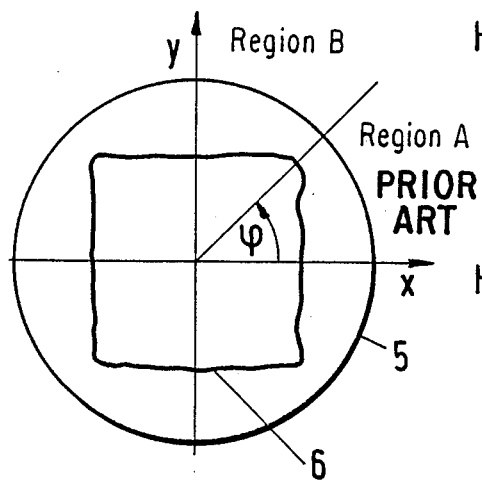
Fig.3
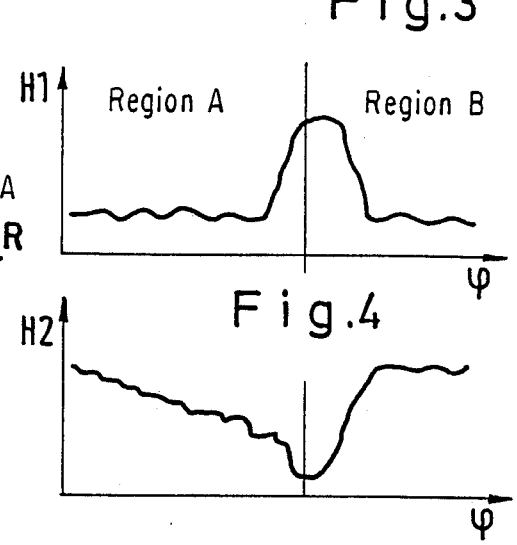
Fig.4
Fig.5
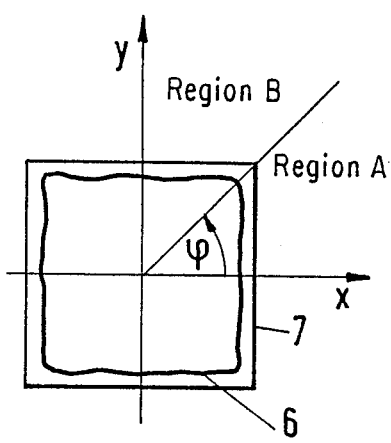
Fig.6
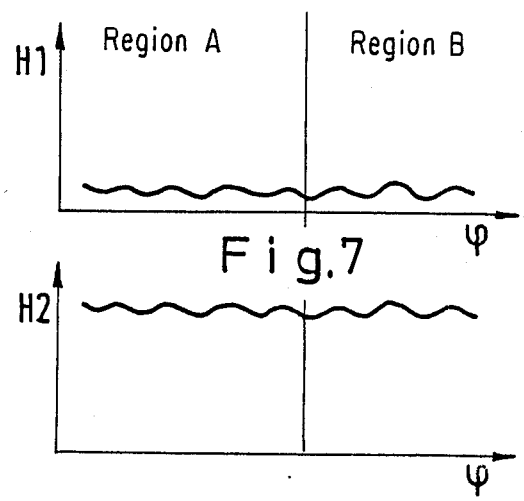
Fig.7

4,948,934

PROCESSING METHOD FOR PLANETARY EROSION

BACKGROUND OF THE INVENTION

The present invention relates to a processing method for the planetary erosion of an existing depression, whereby for a finishing or dressing operation, relatively cyclical lateral translational movement is carried out between a tool electrode and a workpiece, and whereby, using a final target value path, the actual movement is effected by regulating the width of the erosion gap via the deflection or travel radius.

Erosion methods are removal processing methods with which, by electrical discharge procedures between a tool electrode and an electrically conductive workpiece, under an operating medium, removal or erosion is brought about for the purpose of processing or machining. With a method of the aforementioned general type, the removal or erosion is effected by successive, chronologically separate, non-stationary or quasi-stationary electrical discharges.

During planetary erosion, three-dimensional translational movements between the tool electrode and the workpiece are superimposed over the linear movement that is conventional with immersion erosion (see "Industry-Anzeiger", Special Edition April 1981, page 109). The three-dimensional translational movement during planetary erosion effects improved operating conditions and results. Particularly advantageous is the possibility of being able to rough and finish with one and the same tool electrode. The finishing or dressing is effected with less discharge energy than is the case for roughing, so that the width of the gap between the tool electrode and the workpiece must be reduced. With immersion erosion, this is possible only by replacing the tool electrode, and with planetary erosion can be achieved via the translational movement. In addition, due to the additional translational movement, the flushing conditions in the operating medium are improved, so that disruptive defective discharges due to removed material between the tool electrode and the workpiece can be avoided. Furthermore, the width of the gap between the tool electrode and the workpiece can be rapidly controlled to avoid faulty discharges, because the electrode can also be withdrawn laterally. In addition, the lateral translational movement has a favorable effect upon the wear distribution of the tool electrode (see "Industry-Anzeiger", op. cit., page 109 et seq).

However, the movements during planetary erosion also cause special problems, which occur in particular with tool electrodes that have corners and edges. Above all, the so-called deflection or travel strategy must be taken into account, pursuant to which the movements between the tool electrode and the workpiece are carried out until the prescribed maximum geometry is achieved.

With the heretofore known methods, predominantly circular translational movements are carried out. Included herewith is the so-called stripping and the so-called expansion in stages, whereby after a radial translational movement or a radial translational step, circular translational movements are carried out. Also included in the above is the so-called continuous expansion, with which a helical translational movement is carried out (see "Blech Rohre Profile" 27 (1980) 9, pages 539 to 544).

During the expansion in stages, due to the increase of the radius that is constant for each planetary revolution, and due to the subsequent translational movement along an exactly circular path, a defined workpiece volume is removed or eroded during each planetary revolution. Superimposed over the planetary movement is a regulation of the width of the erosion gap, so that essentially the normal discharges that occur with average gap width take place, and neither the no-load pulses that are caused by large gap widths, nor the defective discharges that are caused by small gap widths, are brought about. With this travel strategy the regulation is essentially effected via the velocity or rate of the translational movement. In addition, under certain geometries of the tool electrodes greatly fluctuating size differences of the engagement surfaces can result, which have a considerable impact upon the performance of the process. For example, where the electrode has a cross-sectional configuration with corners, a continuous change occurs between surface and linear engagement, with the workpiece volume being eroded much slower at the surfaces than in the corner regions.

In contrast, during the continuous expansion the tool electrode is swung outwardly as far as possible relative to the workpiece in conformity with the respective width of the erosion gap, and at the same time is moved past the surface that is to be eroded at a nearly constant angular velocity. The regulation of the width of the erosion gap is under these conditions effected via the changing of the actual deflection or travel radius. A movement in the main immersion direction can also be linked herewith, as a result of which each volume element of the tool electrode moves along a cone-shaped shell surface relative to the workpiece.

The actual movement of the tool electrode relative to the workpiece in a plane perpendicular to the main immersion direction approaches the cross-sectional configuration of the tool electrode during the course of the processing due to the volume characteristics that are to be removed at the corners and surfaces of the depression. In so doing, toward the end of the processing, and especially in the corners, great no-load regions occur in which the tool electrode has achieved the maximum extent of expansion. Methods are known that, in order to avoid or reduce efficiency losses, control the velocity of the translational movement as a function of the processing state, whereby the no-load regions are swept over at a greater velocity (see "Industry-Anzeiger", op. cit., pages 112 et seq). However, during the course of the processing, there results with this heretofore known method great differences between the geometry of the final target value path and the geometrically distorted actual movement, whereby these differences can fluctuate greatly over a single planetary revolution as a function of the geometry of the tool electrode. This can overcharge the gap width regulating system, so that the number of defective discharges increase, which results in increased wear of the tool electrode. This can make it necessary to adjust the gap width regulating system, which adjustment occurs at the critical process regions and results in efficiency losses at the less critical process regions.

It is therefore an object of the present invention to provide an improved processing method for a continuous expansion with planetary erosion, with this method in particular making possible a favorable process performance and a shorter processing time.

BRIEF DESCRIPTION OF THE DRAWINGS

This object, and other objects and advantages of the present invention, will appear more clearly from the following specification in conjunction with the accompanying schematic drawings, which illustrate a conventional method for planetary erosion and inventive methods, and in which:

FIG. 1 is a perspective view of a tool electrode and workpiece during planetary erosion;

FIG. 2 is a view that illustrates, in a coordinate system, the final target value path and the actual movement of the tool electrode during conventional planetary erosion;

FIG. 3 is a view that shows a graph in which a component of the short spark lag times H1 is plotted versus the planetary angle $\phi$ during conventional planetary erosion;

FIG. 4 is a view that shows a graph in which the component of the mean spark lag times H2 is plotted versus the planetary angle during conventional planetary $\phi$ erosion;

FIG. 5 is a view that illustrates, in a coordinate system, the preset target value path and the actual movement during planetary erosion pursuant to the present invention;

FIG. 6 is a view that shows a graph in which the component of the short spark lag times H1 is plotted versus the planetary angle $\phi$ during inventive planetary erosion;

FIG. 7 is a view that shows a graph in which the component of mean short spark lag time H2 is plotted versus the planetary angle $\phi$ during inventive planetary erosion;

SUMMARY OF THE INVENTION

Figure 8:
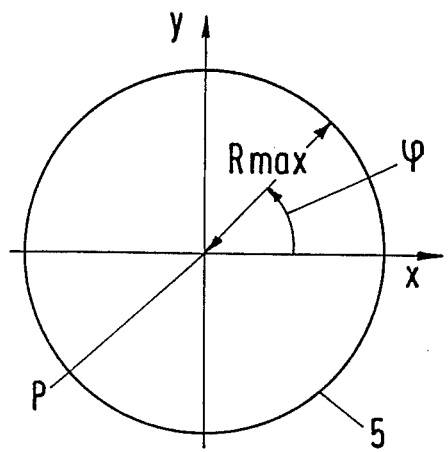
FIG. 8 is a view that illustrates the final target value path of the tool electrode in a coordinate system.
Figure 9:
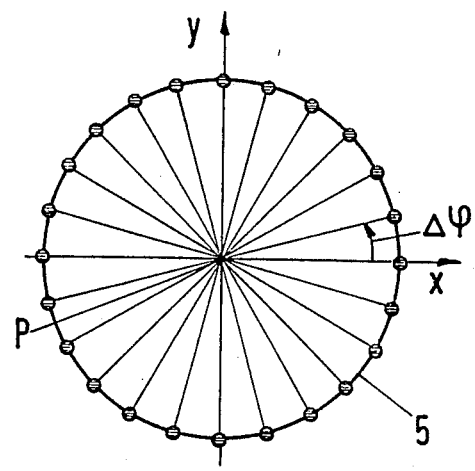
FIG. 9 illustrates the same target value path, again in a coordinate system, but this time split into angular steps $\Delta\phi$.

The method of the present invention is characterized primarily by the step of defining a preset target value path for each planetary revolution by determining the actual movement of at least one preceding planetary revolution and by using a target value/actual value difference that results in an optimum process progress, with each preset target value path being delimited by the final target value path.

Thus, with an inventive processing method, during each planetary revolution the actual movement of at least one preceding planetary revolution is taken into account when defining the preset target value path, so that greater fluctuations of the differences between the preset target value path and the actual movement can be avoided over a planetary revolution. This is so because the preset target value path for each planetary revolution is effected by using a target value/actual value difference that results in an optimum process progress, and with which, for example, the engagement conditions of the tool electrode that are to be expected, or the translational velocity, can be taken into account. However, the optimum target value/actual value difference is determinative for the preset target value path only to the extent that the final target value path is not exceeded. To the extent that this is the case for a planetary revolution at individual locations or by regions, the preset target value path coincides with the final target value path.

The actual movement of the tool electrode can, for example, be determined by a test run, and can form the basis for each further machining process. However, this has the drawback that disruptions of the processing progress are not taken into account in individual cases for the determination of the preset target value path. It is therefore preferable to determine the actual movement during each machining process.

An inventive processing method has the particular advantage that a nearly uniform difference between the preset target value path and the actual movement of the tool electrode can be assured, thus relieving the gap width regulation system, and in particular also avoiding defective discharges in the transition regions of the corners and surfaces of the depression. Inherent with the favorable process performance of the inventive method is a shorter processing time and less wear on the tool electrode, because predominantly removal-intensive normal discharges occur over the entire planetary revolution.

Pursuant to one specific embodiment of the inventive method, the radii of t he actual movement are determined in preselected angular steps about a planetary center, thus facilitating, for example, the processing of the data of the actual movement, because for each radius only a single datum has to be stored and processed.

In so doing, each determined radius of the actual movement can be increased for the preset target value path of a subsequent planetary revolution by a target value/actual value difference that is prescribed as a function of the expected removal rate until a maximum radius that ends in the final target value path is obtained. The expected removal rate depends, for example, upon the pulse parameters of the electrical discharge processes. This preferably assures that each radius of the preset target value path is at least as great as the radius of the preset target value path of the preceding planetary revolution at the same planetary angle, so that the effects of brief process disruptions upon the preset target value path, which disruptions effect a withdrawal of the tool electrode in the direction of the planetary center, are reduced.

Pursuant to another specific embodiment of the present invention, a change of the preset target value path relative to the preceding planetary revolution does not occur if the sum of the deviations determined at specific planetary angles between the preset target value path and the actual movement for one planetary revolution exceeds a predetermined threshold value, whereby for this case the same preset target value path, without increase of the radii, is applicable for the subsequent planetary revolution. The preset target value path is repeated for a subsequent planetary revolution if greater deviations exist between the actual movement of the previous planetary revolution and the pertaining preset target value path. In this way, to a large extent an adaptation of the actual movement to the underlying preset target value path, and a further stabilization of the process, are achieved.

Pursuant to a further specific embodiment, the determined actual movement of a planetary revolution is replaced by linear sections, and for the preset target value path, linear preset target value path sections are defined by shifting the linear sections. The linear sections can, for example, be straight regression lines that replace more than two determined points of the actual movement. Depending upon the expected removal rate, the linear target value path sections are shifted away from the planetary center relative to the linear sections. By defining the linear target value path sections, a further stabilization of the process is achieved, since irregularities of the actual movement of preceding planetary revolutions, which irregularities are caused by possible process disruptions, are determined.

For presetting the target value path, the radii of the point of intersection of the linear sections are preferably increased by a predetermined amount while maintaining the respective planetary angle, and the linear target value path sections are disposed by the endpoints of the increased radii, thereby in particular achieving simplification of calculations.

Preferably only that number of determined points of the actual movement is replaced by linear sections that the perpendicular distances of these points from the linear sections do not exceed a prescribed threshold value.

The mathematical determination of the linear sections is simplified if the points of intersection of the linear sections are at the same time points of the determined actual movement. In that case, the endpoints of the linear sections coincide wit the actual movement, and merely regions of the actual movement disposed therebetween are replaced by the straight lines.

Pursuant to another specific embodiment, for each planetary revolution the actual movement is replaced by linear sections, and a preset target value path for the following planetary revolution is effected by shifting the linear sections. This guarantees an optimum preset target value path for each planetary revolution.

However, it is often sufficient if after a prescribed number of planetary revolutions, the actual movement is replaced by linear sections, and a preset target value path for the subsequent planetary revolution is effected by shifting the linear sections, whereby the preset target value path for the remaining planetary revolutions is effected by increasing the radii of the points of intersection of the linear target value path sections of the preset target value path of the previously completed planetary revolution by the same prescribed amount. This simplified procedure takes into account the fact that over a limited number of planetary revolutions, only slight geometric distortions of the actual movement occur.

However, the actual movement could also be replaced by linear sections, and a preset target value path for the subsequent planetary revolution can be effected by shifting the linear sections if the sum of the deviations determined at specific planetary angles between the preset target value path and the actual movement for one planetary revolution exceeds a prescribed threshold value, whereupon the preset target value path for the remaining planetary revolutions is effected by increasing the radii of the points of intersection of the linear target value path sections of the preset target value path of the previously completed planetary revolution by the same prescribed amount. In this way, a preset target value path is based upon the actual movement of the last planetary revolution if this actual movement deviates significantly from the simplified preset target value path of the last planetary revolution.

In this connection, the sum of the deviations between the preset target value path and the actual movement for one planetary revolution is preferably determined at the points of intersection of the linear target value path sections and the points of intersection of the linear sections.

Pursuant to a further specific embodiment of the present invention, a change of the preset target value path relative to the preceding planetary revolution is not effected for the planetary revolutions that take place after the actual movement of the preceding planetary revolution is replaced by linear sections if the sum of the deviations between the preset target value path and the actual movement for one planetary revolution at the points of intersection of the linear target value path sections and the points of intersection of the linear sections exceeds a predetermined threshold value, whereby for this case the same preset target value path, without increase of the radii, is applicable for the subsequent planetary revolution. This promotes maintenance of the preset target value path by the actual movement.

Pursuant to another specific embodiment of the present invention, at the beginning of a first processing stage, for the determined actual movement that is replaced by linear sections, geometrically similar preset target value paths are maintained not only therefor but also for all subsequent processing stages at the same geometry for the tool electrode. A first processing stage is effected after an adequate erosion phase, and can comprise a roughing of the depression. Further processing stages are effected at a reduced pulse capacity of the electrical discharge procedures, whereby a prefinishing or finishing of the depression is effected. This takes into account the fact that the actual movement of the tool electrode is carried out along a path that resembles the cross-sectional configuration thereof, and that changes geometrically only relatively slightly during the entire machining process. With this method, the first preset target value path of the last preset target value path of the same processing stage is geometrically registered, and the last preset target value path of the processing stage of the first preset target value path of the next processing stage is similarly geometrically registered.

Pursuant to another specific embodiment, starting from the actual movement, the expansion of the preset target value path for each planetary revolution is effected in as uniform a manner as possible, whereby the difference between the minimum and maximum distance of the preset target value path from the planetary center remains in as small a range as possible. In this way, the actual movement approaches a circular path, and no-load regions that occur during expansion to a circular final target value path, and accompanying losses of efficiency, are avoided. For this purpose, the velocity of the translational movement can be prescribed as a function of the respective actual travel or deviation radius, whereby smaller actual travel radii correspond to lower velocities, and vice versa. Due to the increased retention time of the tool electrode at smaller actual travel radii, a particularly removal-intensive processing is effected. However, the respective extent of expansion of the radii can also be prescribed as a function of the respective actual travel radius, whereby smaller actual travel radii correspond to greater feed rates, and vice versa. These measures can also at the same time be undertaken with an influencing of the velocity of the translational movement. High feed rates are to be equated with an optimum width of the erosion gap, whereby removal intensive normal discharges are effected.

Pursuant to another specific embodiment of the present invention, the regulation of the gap width is effected via the travel radius in a known manner in a predominantly lateral direction, so that for the purpose of the regulation, the tool electrode need not be withdrawn from the depression. However, the regulation of the gap width via the travel radius can also be effected in a known manner simultaneously in a lateral direction and in the direction of the main immersion movement, i.e. vertically, as a result of which defective discharges at any location of the erosion gap can be counteracted.

Pursuant to a further specific embodiment, the final target value paths for each processing stage or immersion depth are circular paths of preselected maximum radius that independent of the geometry of the tool electrode, during expansion of the already existing depression bring about the least removal volume for the erosion of edge zones and surface roughness of the respective preceding processing stage.

However, the final target value paths for each processing stage or immersion depth can also end in a noncircular geometric shape having preselected maximum dimensions, especially in a square, a triangle, other closed polygons or sequentially coupled circular segments.

To take into account the actual geometry of the path and the actual process performance of the respective planetary revolution, high velocities of the translational movement can be provided for large engagement surfaces of the tool electrode and in no-load regions. In this way, improved flushing conditions in the working medium are achieved, and losses of efficiency are avoided. The actual geometry of the path and the actual process performance can also be taken into account by having a low velocity of translational movement upon engagement of the corner regions of the tool electrode. In this way, reductions of the width of the erosion gap by oversweeping of the electrode during the necessary changes in direction are avoided. Finally, the velocity of the translational movement can be controlled by measuring and processing the spark lag time of the individual discharges.

Further specific features of the present invention will be described in detail subsequently.

DESCRIPTION OF THE PREFERRED EMBODIMENTS

Referring now to the drawings in detail, FIG. 1 shows a workpiece 1 that is provided with a depression 2 into which a tool electrode 3 is introduced in the main direction of immersion H. Customarily, the workpiece is not movable, and exclusively the tool electrode 3 is moved. This is the starting point for what follows, although for carrying out the method the important thing is merely the inventive relative movement between the workpiece 1 and the electrode 3. Within the depression 2, the electrode 3 carries out a cyclical lateral translational movement T, which can, for example, be a circular movement. In so doing, the width of an erosion gap 4 formed between the workpiece 1 and the electrode 3 is subjected to periodic localized fluctuations. Removal or erosion-intensive normal discharges occur where the width of the erosion gap 4 has average values.

FIGS. 2 to 4 will now be used to explain the most important considerations and observed specific process conditions that have led to the development of the inventive method for the reconciliation of the preset target value path to the actual movement of the tool electrode. FIG. 2 shows a final target value path 5 of the electrode 3, and the actual movement 6 thereof in a plane perpendicular to the main direction of immersion H. Also illustrated is the lateral translational movement of the tool electrode. With conventional planetary erosion, the preset target value path for each planetary revolution always corresponds to the final target value path 5, which in turn is coordinated to the maximum extent of expansion of the depression 2 that is to be produced. As illustrated, the final target value path 5 generally has a circular shape. In this connection, the regulation of the radius of the planetary movement during the planetary revolution is effected only on the basis of the conditions that develop in the erosion gap 4. The radius can be regulated not only by a movement of the tool electrode 3 exclusively in a radial direction, but also by a superimposed movement in the main direction of immersion H. In the latter case, the volume elements of the tool electrode 3 move on a cone-shaped shell surface. However, by proceeding in this manner the respective cross-sectional configuration of the tool electrode 3, and the engagement conditions resulting therefrom, are not taken into consideration.

Due to the volume quantity that is to be removed in the region of the corners and surfaces of the depression 2, after a sufficiently long erosion phase the actual movement or path 6 of the tool electrode 3 has a geometric shape that is similar to the cross-sectional configuration of the electrode 3. Thus, in this case the actual path 6 resembles a square. When the actual path 6 achieves the radius of the final target value path 5 in the corner regions, the maximum extent of expansion of the depression 2 also exists in these locations, so that these are no-load regions for the tool electrode 3. The difference between the final target value path 5 and the actual movement 6 periodically fluctuates over a planetary revolution, i.e. it depends upon the respective planetary angle $\phi$. Thus, this difference continuously decreases ahead of the corner region, as a result of which the electrode experiences a less strong "impulse" toward the outside in the region A. The result is a width of the erosion gap 4 in the middle that increases. During transition from the region A into the region B, the difference between the final target value path 5 and the actual movement 6 in contrast increases rapidly, as a result of which the electrode is swung further to the outside, although in conformity with the actual movement 6 a reduction of the radius results. As a consequence, especially immediately after the transition from the region A into the region B, a width of the erosion gap 4 that is too small in the middle results.

As can be seen from FIGS. 3 and 4, this tendency has a disadvantageous effect upon the process performance. The component H1 of the very short spark lag times, which bring about high electrode wear, initially remain approximately constant under the presumption of nearly stable process conditions in the area A. In conformity with the increasing gap width, the component H2 of the mean spark lag times that can be viewed as erosion effective decreases. In the transition from the region A into the region B, in which a change of direction of the translational movement of the tool electrode 3 is effected, the component H1 of short spark lag times increases due to the small gap width that develops. Only with progressive planetary movements does the component of mean spark lag times H2, after sinking to a minimum value, again increase. At the same time, the component of short spark lag times H1 stabilizes at a low value. This process is repeated at every change of direction of the tool electrode 3, and has a negative impact upon the removal or erosion process, i.e. the processing time and the electrode wear.

Further drawbacks result during a constant angular velocity of the translational movement T of the tool electrode from the conditions of the circumferential velocity of the translational movement. Since in this case the circumferential velocity of the translational movement is a function of the actual radius of the planetary movement, smaller relative velocities between the tool electrode 3 and the workpiece 1 result in the region of the middle of the side of the electrode 3. However, it is just in this region that unfavorable scavenging conditions exist due to the large engagement surfaces. In contrast, in the corner regions the circumferential velocity of the translational movement T is large, so that the additional danger of an unfavorable reduction of the width of the erosion gap 4 due to an overshooting of the electrode 3 exists. These tendencies additionally have a negative impact upon the removal or erosion process.

As shown in FIG. 5, there is effected pursuant to an inventive method, an adaptation of a preset target value path 7 for the translational movement T of each planetary revolution to the actual movement 6, and thus ultimately to the cross-sectional configuration of the tool electrode 3. The geometry of the preset target value path 7 is thus nearly square. As shown in FIGS. 6 and 7, as a result the aforementioned drawbacks are essentially overcome, so that an influence of the corner transition from region A into region B is no longer recognizable on the process performance that is characterized by the spark lag times H1 and H2. A further improvement of the operating results can be achieved if additionally the velocity of the translational movement T is adapted to the geometric conditions, i.e. if the side surfaces of the tool electrode 3 erode at increased velocity, while the corner regions erode at reduced velocity. The improvements of the operating results can be seen in particular in the operating time that can be achieved, in the electrode wear, and in the surface quality that can be achieved.

The advantages of an inventive method are also provided where the tool electrodes 3 do not have a rotationally symmetrical cross-sectional configuration. Due to the large number of possible geometries for the tool electrodes 3, in practical usage a prior programming of the respective preset target value pass is not expedient, especially since in so doing unforeseen process disruptions are not taken into account. Nonetheless, it is possible, with the aid of a previously completed machining process, to determine the actual movement of the tool electrode 3, and via a previously completed trial run, to fix the preset target value path for all of the planetary revolutions of subsequent machining processes. However, this can be done only for a given geometry of the tool electrode 3 and one given processing result.

It is particularly advantageous if during expansion of an already existing depression to a particular maximum extent of expansion, for the removal or erosion of the thermally effected edge zone and the surface roughness of the preceding processing stages the final target value path 5 is a circular path, because in so doing the least possible erosion volume is provided. Due to these considerations, the preset target value path 7 is preferably determined by continuous measurements of the actual movement 6 of the tool electrode 3 during the machining process.

For the continuous measurement of the actual movement 6, first the final target value path 5 with the radius $R_{max}$ (FIG. 8) is split up into angular steps $\Delta\phi$. The origin of the coordinate system of FIGS. 8 to 11 is at the same time the center P of the planetary movement. The final target value path 5 can, with an inventive method, also be other than a circular path. The issuance of the preset target value path 7 is effected in partial stretches in conformity with these angular steps $\Delta\phi$.

Figure 10:
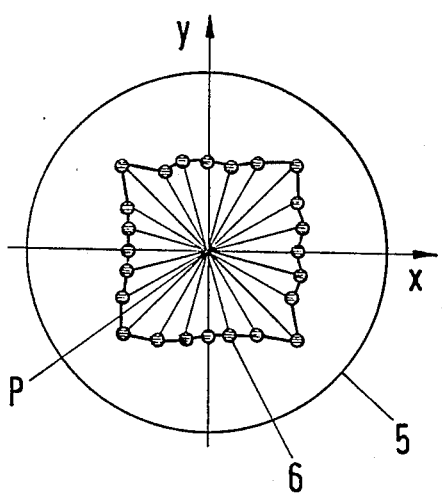
FIG. 10 is a view that illustrates, in a coordinate system, the actual movement of the tool electrode split into the same angular steps.
Figure 11:
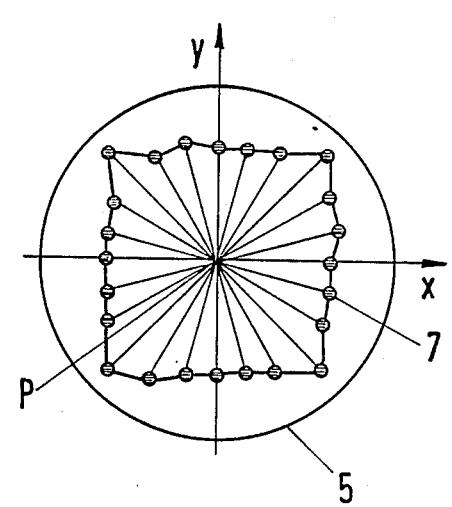
FIG. 11 is a view that illustrates, in a coordinate system, the preset target value path for a subsequent planetary revolution of the same tool electrode.

As illustrated in FIG. 10, for this purpose for every planetary revolution of the tool electrode 3, after completion of the individual partial stretches, the actual position of the actual movement 6 is measured. As illustrated in FIG. 11, the measured positions of the actual movement 6 are used to determine the preset target value path 7 of the subsequent planetary revolution by increasing the measured radii for the respective angular steps by a prescribed amount. This sequence is repeated until the desired maximum radius of the final target value path 5 is achieved. This assures an only slight difference between the preset target value path 7 and the actual movement 6 of the tool electrode 3 during each planetary revolution. The other required regulating movements for keeping the width of the erosion gap 4 constant are effected in the previously described manner.

Figure 12:
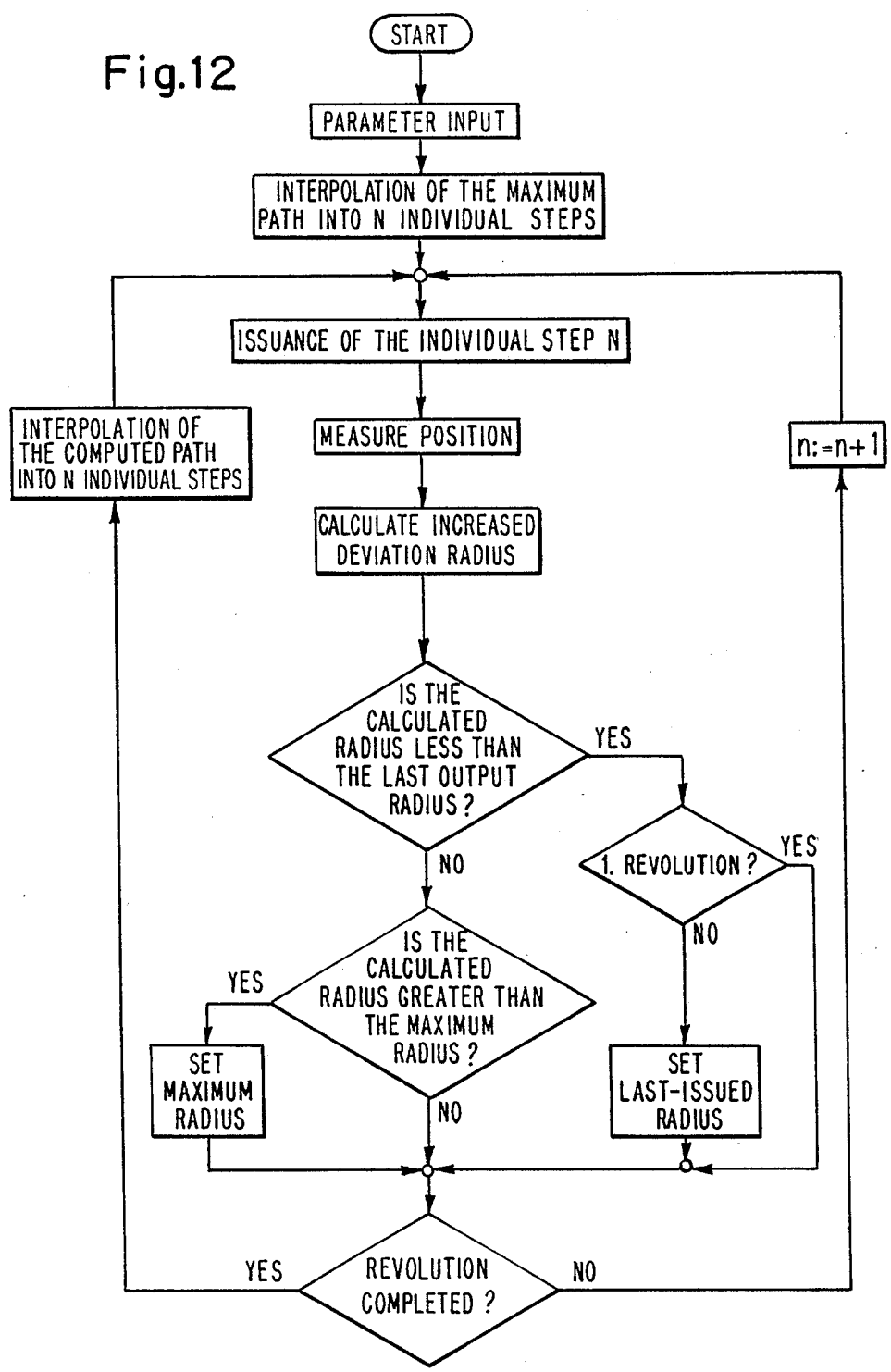
FIG. 12 is a view that shows a diagram illustrating data acquisition and data processing pursuant to one inventive method.

The same process is repeated in FIG. 12 in the form of a flow diagram that can form the basis of a control via a process computer. After the start of the process, a parameter input is required that relates in particular to the final target value path. In conformity with the method of proceeding illustrated in FIGS. 8 and 9, the final target value path is then split into N individual steps.

Thereupon, the first individual step is issued as the preset target value path for the tool electrode. The position reached by the actual movement is subsequently measured and is used for calculating the increased radius of the preset target value path for the subsequent planetary revolution at the same planetary angle.

As indicated by the first decision diamond, a reduction of the radius relative to the preset target value path of the preceding planetary revolution is prevented by once again setting the last issued radius of the preset target value path. In so doing, temporary process disruptions that effect a retreat of the tool electrode in a direction toward the planetary center via the regulation of the width of the erosion gap, are not taken into consideration for the preset target value path of the next planetary revolution. It is only during the first planetary revolution that such process disruptions are taken into account.

However, if the calculated radius is greater than the last-issued radius of the preset target value path, the calculated radius is substituted for the last-issued radius unless the maximum radius has been exceeded. In such a case, the maximum radius of the final target value path is set to be issued for the next planetary revolution.

In the event that the planetary revolution has not yet been completed, the next individual step n is issued and the described processes of measuring the actual movement and of calculating the value of the preset target value path are repeated for the subsequent planetary revolution.

However, if a complete planetary revolution has been completed, an interpolation of the calculated preset target value path into N individual steps can again be effected in order for this preset target value path to form the basis of a further planetary revolution.

This pattern is followed until all of the measured positions of the actual movement have reached the maximum radius of the final target value path. The depression is then expanded to the desired extent, and the machining process is terminated.

Figure 13:
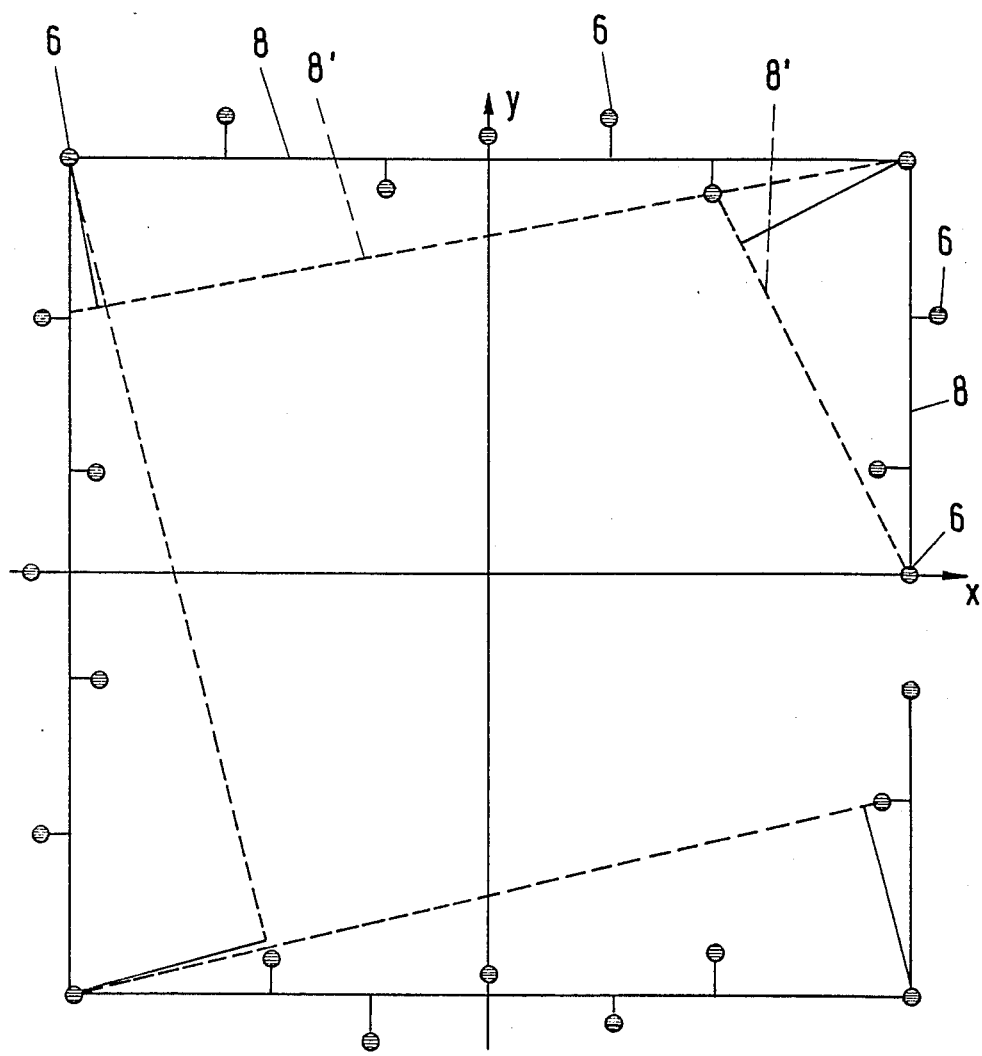
FIG. 13 is a view that illustrates, in a coordinate system, the replacement of the actual movement of a planetary revolution of a tool electrode by linear, sections.

As shown in FIG. 13, the detected or recorded points of the actual movement 6 can be further processed for the preset target value path. In so doing, the actual movement 6 is split into longer linear sections 8, the direction of which are essentially parallel to the respective side surfaces of the tool electrode In so doing, a further process stabilization is achieved, since despite approach of the preset target value path to the actual movement 6, a transfer of regulation movements to the calculated preset target value path is for the most part suppressed. However, a mere increase of the angular steps during pick-up of the measured values is not an expedient measure for reducing the number of linear sections 8 while maintaining the required precision. This is so because the corner transitions of the actual movement 6 can then not be clearly identified.

Pursuant to the inventive method, a straight line is drawn on the positive x-axis of the coordinate system from the first measured point of the actual movement 6 to the third measured point. If the perpendicular distance of the measured point of the straight line disposed therebetween is less than a prescribed threshold value, the straight line is drawn from the first to the fourth measured point, and again the distance of all measured points disposed therebetween is determined. This is continued until one of the point distances exceeds the prescribed threshold value. This is the case with the linear section 8', because from here the third measured point has a distance that exceeds the threshold value The measured point prior to the last one then forms the endpoint of the linear. section 8, and the linear formation then begins again with this measured point until the entire planetary revolution is concluded.

The splitting of the actual movement 6 into longer linear sections can then either be repeated pursuant to various criteria during the course of the processing, or, starting from the actual movement 6 at the beginning of the first processing stage, i.e. after a sufficiently long erosion phase, can be maintained for all subsequent processing stages for the further dressing of the workpiece surface. In this connection, use is made of the fact that the geometry of the tool electrode is generally not altered, and hence also the volume conditions that are to be removed during a planetary revolution essentially remain the same.

The expansion of the preset target value path is then effected by increasing the radii of the points of intersection of the linear sections in order to achieve a prescribed volume that is dependent upon the anticipated rate of erosion while maintaining the respective planetary angle. Via the increased radii, it is then possible to dispose the linear target value path sections from which the preset target value path is composed.

The increase of the radii is undertaken only if the sum of the deviations between the preset target value path and the actual movement for a planetary revolution between the points of intersection of the linear sections and the linear target value path sections is less than a prescribed threshold value. If this is not the case, the same preset target value path is once again carried out without increasing the radius in order to avoid a constantly increasing deviation between the preset target value path and the actual movement.

Figure 14:
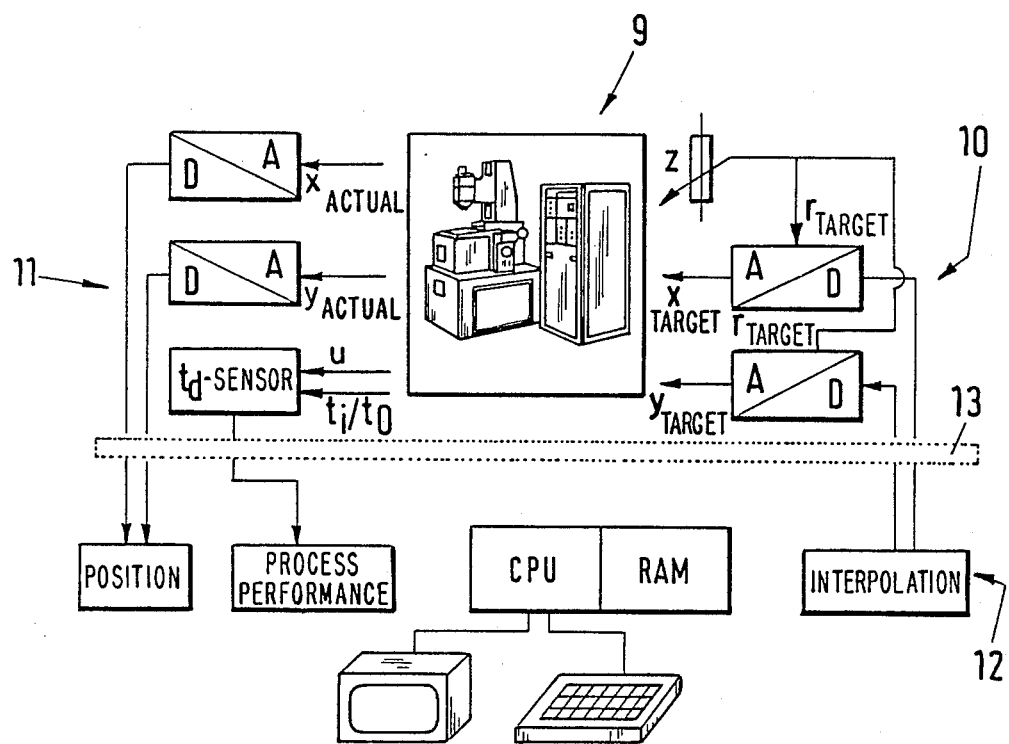
FIG. 14 is a view that schematically illustrates an arrangement for carrying out an inventive method.

The arrangement illustrated in FIG. 14 for carrying out an inventive method includes an erosion machine 9 that is connected via input intersection locations 10 and measuring intersection locations 11 with a process computer 12. Light wave conductors 13 are provided for the galvanic separation of the locations 10, 11 from the process computer 12.

The interpolated values of the preset target value path are stored in the erosion machine 9 via digital-analog convertors that serve as input locations. The actual movement is conveyed to the process computer 12 via analog-digital converters that serve as measuring locations. For information concerning the process condition, the process computer 12 furthermore receives the values of the pulse parameters, for which purpose a $t_d$-sensor is provided that forms a further measuring location 11.

The present invention is, of course, in no way restricted to the specific disclosure of the specification and drawings, but also encompasses any modifications within the scope of the appended claims.

What I claim is:

1. In a processing method for the planetary erosion of an existing depression, whereby for a finishing or dressing operation, a relatively cyclical lateral translational movement is carried out between a tool electrode and a workpiece, and whereby, using a final target value path, the actual movement is effected by regulating the width of an erosion gap via a deviation or travel radius, the improvement including the step of:

defining a preset target value path for each planetary revolution by determining the actual movement of at least one preceding planetary revolution and by using a target value/actual value difference that results in an optimum process progress, with each preset target value path being delimited by the final target value path, and effecting said regulation of the width of the erosion gap via the travel radius in a predominantly lateral direction.

2. A method according to claim 1, which includes the step of determining the radii of said actual movement in preselected angular steps about a planetary center.

3. A method according to claim 2, which includes the step of increasing each determined radius of said actual movement, for the preset target value path of a succeeding planetary revolution, by a target value/actual value difference that is prescribed as a function of the removal rate that is to be expected, until a maximum radius is obtained that ends in said final target value path.

4. A method according to claim 3, in which each radius of the preset target value path is at least as great as the radius of said preset target value path of the preceding planetary revolution at the same planetary angle.

5. A method according to claim 1, which includes the steps of replacing the determined actual movement of a planetary revolution with linear sections, and, for the preset target value path, defining linear preset target value path sections by shifting said linear sections.

6. A method according to claim 5, which includes the steps, starting from said actual movement, of effecting expansion of said preset target value path for each planetary revolution in as uniform a manner as possible, and keeping the difference between a minimum and a maximum distance of said preset target value path from the planetary center in as narrow a range as possible.

7. A method according to claim 6, which includes the step of prescribing the velocity of said translational movement as a function of the respective actual travel radius, with small actual travel radii corresponding to low velocities, and vice versa.

8. A method according to claim 7, which includes the step of prescribing the respective amount of expansion of said radii as a function of the respective actual travel radius, with small actual travel radii corresponding to high feed rates, and vice versa.

9. A method according to claim 1, in which said final target value paths for each processing stage or immersion depth are circular paths that have a preselected maximum radius and that, independent of the geometry of said tool electrode, during expansion of said already existing depression bring about the smallest removal volumes for erosion of edge zones and surface roughness of the respectively preceding processing stage.

10. A method according to claim 5, which includes the steps, for each planetary revolution, of replacing the actual movement with linear sections, and effecting a preset target value path for the succeeding planetary revolution by shifting said linear sections.

11. A method according to claim 1, in which said final target value paths for each processing stage or immersion depth are non-circular paths having preselected maximum dimensions, and include squares, triangles, other closed polygons, and sequentially coupled circular segments.

12. A method according to claim 1, which includes the step of providing a high translational movement velocity upon engagement of large engagement surfaces of said tool electrode and in no-load regions.

13. A method according to claim 1, which includes the step of providing a low translational movement velocity upon engagement of corner regions of said tool electrode.

14. A method according to claim 1, which includes the step of controlling the translational movement velocity via measurement and processing of spark lag times of individual discharges of said tool electrode.

15. In a processing method for the planetary erosion of an existing depression, whereby for a finishing or dressing operation, a relatively cyclical lateral translation movement is carried out between a tool electrode and a workpiece, and whereby, using a final target value path, the actual movement is effected by regulating the width of an erosion gap via a deviation or travel radius, the improvement including the step of:

defining a preset target value path for each planetary revolution by determining the actual movement of at least one preceding planetary revolution and by using a target value/actual value difference that results in an optimum process progress, with each present target value path being delimited by the final target value path;

replacing the determined actual movement of a planetary revolution with linear sections, and, for the preset target value path, defining linear preset target value path sections by shifting said linear sections; and which includes the step, for the determined actual movement that is replaced by linear sections, of, at the beginning of a first processing stage, maintaining geometrically similar preset target value paths not only for this stage but also for all succeeding processing stages, at the same tool electrode geometry.

16. In a processing method for the planetary erosion of an existing depression, whereby for a finishing or dressing operation, a relatively cyclical lateral translational movement is carried out between a tool electrode and a workpiece, and whereby, using a final target value path, the actual movement is effected by regulating the width of an erosion gap via a deviation or travel radius, the improvement including the step of:

defining a preset target value path for each planetary revolution by determining the actual movement of at least one preceding planetary revolution and by using a target value/actual value difference that results in an optimum process progress, with each preset target value path being delimited by the final target value path;

replacing the determined actual movement of a planetary revolution with linear sections, and, for the preset target value path, defining linear preset target value path sections by shifting said linear sections; and which includes the steps of: for said planetary revolutions that take place after replacement of said actual movement of the preceding planetary revolution by linear sections, not effecting a change of the preset target value path relative to the preceding planetary revolution when the sum of deviations between the preset target value path and the actual movement for a given planetary revolution at the point of intersection of the linear target value path sections and the points of intersection of said linear sections exceeds a predetermined threshold value; and in such a case using the same preset target value path for succeeding planetary revolution without increasing the radius of said actual movement.

17. In a processing method for the planetary erosion of an existing depression, whereby for a finishing or dressing operation, a relatively cyclical lateral translational movement is carried out between a tool electrode and a workpiece, and whereby, using a final target value path, the actual movement is effected by regulating the width of an erosion gap via a deviation or travel radius, the improvement including the step of:

defining a preset target value path for each planetary revolution by determining the actual movement of at least one preceding planetary revolution and by using a target value/actual value difference that results in an optimum process progress, with each preset target value path being delimited by the final target value path;

replacing the determined actual movement of a planetary revolution with linear sections, and, for the preset target value path, defining linear preset target value path sections by shifting said linear sections, and effecting said regulation of the width of the erosion gap via the travel radius simultaneously in a lateral direction and in the direction of a main immersion movement.

18. In a processing method for the planetary erosion of an existing depression, whereby for a finishing or dressing operation, a relatively cyclical lateral translational movement is carried out between a tool electrode and a workpiece, and whereby, using a final target value path, the actual movement is effected by regulating the width of an erosion gap via a deviation or travel radius, the improvement therewith including the step of:

defining a preset target value path for each planetary revolution by determining the actual movement of at least one preceding planetary revolution and by using a target value/actual value difference that results in an optimum process progress, with each preset target value path being delimited by the final target value path so that a nearly uniform difference between the preset target value path and the actual movement of the tool electrode can be assured whiled greater variations of said difference are avoided between said preset target value path and said actual movement over a planetary revolution, thus relieving the gap width regulation and also avoiding defective discharge in transition regions of corners and surfaces of the depression in a shorter processing time and less wear on the tool electrode, because predominantly removal-intensive normal discharges occur over the entire planetary revolution.

19. In a processing method for the planetary erosion of an existing depression, whereby for a finishing or dressing operation, a relatively cyclical lateral translational movement is carried out between a tool electrode and a workpiece, and whereby, using a final target value path, the actual movement is effected by regulating the width of an erosion gap via a deviation or travel radius, the improvement including the step of:

defining a preset target value path for each planetary revolution by determining the actual movement of at least one preceding planetary revolution and by using a target value/actual value difference that results in an optimum process progress, with each preset target value path being delimited by the final target value path;

determining the radii of said actual movement in preselected angular steps about a planetary center;

increasing each determined radius of said actual movement, for the preset target value path of a succeeding planetary revolution, by a target value/actual value difference that is prescribed as a function of the removal rate that is to be expected, until a maximum radius is obtained that ends in said final target value path; and each radius of the preset target value path being at least as great as the radius of said preset target value path of the preceding planetary revolution at the same planetary angle, not effecting a change of the preset target value path relative to the preceding planetary revolution when the sum of deviations determined at specific planetary angles between the preset target value path and the actual movement for a given planetary revolution exceeds a predetermined threshold value; and in such a case using the same preset target value path for the succeeding planetary revolution without increasing the radii.

20. In a processing method for the planetary erosion of an existing depression, whereby for a finishing or dressing operation, a relatively cyclical lateral translational movement is carried out between a tool electrode and a workpiece, and whereby, using a final target value path, the actual movement is effected by regulating the width of an erosion gap via a deviation or travel radius, the improvement including the step of:

defining a preset target value path for each planetary revolution by determining the actual movement of at least one preceding planetary revolution and by using a target value/actual value difference that results in an optimum process progress, with each preset target value path being delimited by the final target value path;

replacing the determined actual movement of a planetary revolution with linear sections, and, for the preset target value path, defining linear preset target value path sections by shifting said linear sections; and which includes the steps, for the preset target value path, of: increasing the radii of points of intersection of said linear sections by a predetermined amount, while maintaining the respective planetary angle; and placing said linear preset target value path sections through endpoints of said increased radii.

21. A method according to claim 20, in which perpendicular distances of said actual movement that is replaced by said linear sections from said linear sections does not exceed a predetermined threshold value.

22. A method according to claim 20, in which said points of intersection of said linear sections are at the same time points of said determined actual movement.

23. In a processing method for the planetary erosion of an existing depression, whereby for a finishing or dressing operation, a relatively cyclical lateral translational movement is carried out between a tool electrode and a workpiece, and whereby, using a final target value path, the actual movement is effected by regulating the width of an erosion gap via a deviation or travel radius, the improvement including the step of:

defining a preset target value path for each planetary revolution by determining the actual movement of at least one preceding planetary revolution and by using a target value/actual value difference that results in an optimum process progress, with each preset target value path being delimited by the final target value path;

replacing the determined actual movement of a planetary revolution with linear sections, and, for the preset target value path, defining linear preset target value path sections by shifting said linear sections, and which includes the steps of: after a prescribed number of planetary revolutions, replacing said actual movement with linear sections and effecting a preset target value path for the succeeding planetary revolution by shifting said linear sections by a predetermined amount; and effecting a preset target value path for the remaining planetary revolutions by increasing the radii of points of intersection of said linear preset target value path sections by the same predetermined amount.

24. In a processing method for the planetary erosion of an existing depression, whereby for a finishing or dressing operation, a relatively cyclical lateral translational movement is carried out between a tool electrode and a workpiece, and whereby, using a final target value path, the actual movement is effected by regulating the width of an erosion gap via a deviation or travel radius, the improvement including the step of:

defining a preset target value path for each planetary revolution by determining the actual movement of at least one preceding planetary revolution and by using a target value/actual value difference that results in an optimum process progress, with each preset target value path being delimited by the final target value path;

replacing the determined actual movement of a planetary revolution with linear sections, and, for the preset target value path, defining linear preset target value path sections by shifting said linear sections;

replacing said actual movement with linear sections and effecting a preset target value path for the succeeding planetary revolution by shifting said linear sections by a predetermined amount when the sum of deviations determined at specific planetary angles between the preset target value path and the actual movement for a given planetary revolution exceeds a predetermined threshold value; and effecting a preset target value path for the remaining planetary revolutions by increasing the radii of points of intersection of said linear preset target value path sections by the same predetermined amount.

25. A method according to claim 24, in which includes the step of determining the sum of the deviations between said preset target value path and said actual movement for a given planetary revolution at the points of intersection of the linear target value path sections and the points of intersection of said linear sections.

* * * * *